Sept. 27, 1932.   L. O. GRANGE   1,879,194
VULCANIZING APPARATUS
Filed Oct. 29, 1929
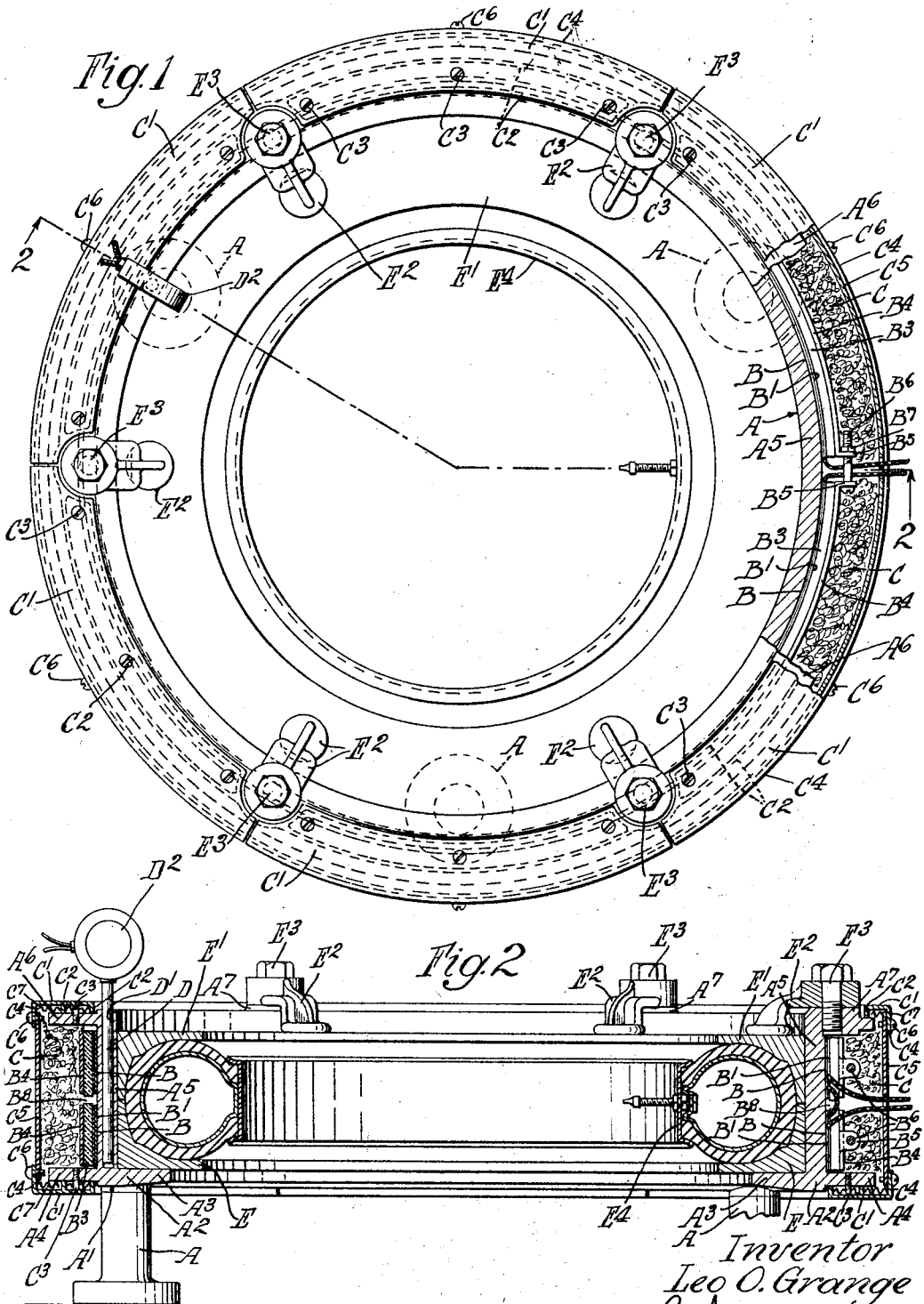

Patented Sept. 27, 1932

1,879,194

UNITED STATES PATENT OFFICE

LEO O. GRANGE, OF CHICAGO, ILLINOIS, ASSIGNOR TO WALTER J. JARRATT, OF CHICAGO, ILLINOIS

VULCANIZING APPARATUS

Application filed October 29, 1929. Serial No. 403,243.

My invention relates to a retreader for automobile tires or casings and has for one object to provide improved heating means for such a retreader. Another object is the provision of a retreader which shall be simple, easy and efficient in use. Another purpose is the provision of improved heat insulating means for controlling the heat applied to such a retreader. Another object is the provision of improved means for heating such a retreader by electricity, without the employment of a fluid heating medium. Other objects will appear from time to time in the course of the specification and claims.

I illustrate my invention more or less diagrammatically in the accompanying drawing wherein Figure 1 is a plan view with parts broken away; and Figure 2 is a section on the line 2—2 of Figure 1.

Like parts are indicated by like symbols throughout the specification and drawing.

Referring to the drawing, A indicates any suitable supporting members, with which is associated, or upon which is supported a main frame member generally indicated as $A^1$ which includes a lower horizontal member $A^2$ with an inner portion $A^3$ projecting inwardly within the supporting members A and an outer portion $A^4$ projecting externally of the supports A. $A^5$ is a generally cylindrical rim or ring and $A^6$ is a horizontal upper rim or flange conforming generally to and overlying the corresponding lower member $A^4$. A plurality of bosses $A^7$ are provided about the rim $A^6$, these bosses being aligned above the rim or ring $A^5$.

Secured about the exterior surface of the member $A^5$ are annular heating elements. Each such heating element includes an inner heat resisting insulating member B opposed to the exterior surface of the member $A^5$. $B^1$ indicates the resistance element proper, which may be formed of any suitable wire or metallic member which becomes heated upon the passage of current therethrough. $B^3$ is a relatively thin layer of a heat resisting insulation such as asbestos or the like. These thin heating element bands are quite flexible. The composite member so formed may be held in position, as by the ring $B^4$ the ends of which may be upset as at $B^5$ to receive the securing screw or bolt $B^6$ with its nut $B^7$. By the employment of this or equivalent securing and tightening means the ring or band $B^4$ may be drawn up about the heating element, to hold it in intimate contact with the opposed face of the member $A^5$. As shown in Figure 2 I illustrate an upper and a lower heating element separated by a space $B^8$, the purpose of which spacing will later appear.

The space between the flanges or rings $A^4$ and $A^6$ may be filled with any suitable insulating material C, which may be asbestos or mineral wool or any other insulating means. In order to confine this insulating material and in order also to protect the operator from contact with the necessarily highly heated members $A^4$ and $A^6$ I may employ angle segments $C^1$ spaced from the flanges as by the inward projections $C^2$ and secured to them as by the screws $C^3$. Each such angular segment is provided with the flange $C^4$, the flanges extending toward each other as shown in Figure 2. Secured to these flanges may be any suitable arcuate sheet members $C^5$ secured to the portion $C^4$ as by the screws $C^6$. $C^7$ indicates any suitable insulating means, such as sheet asbestos, whereby the members $C^1$ are insulated from the heated flanges $A^4$ $A^6$.

D indicates any suitable thermostatic member which penetrates a bore $D^1$ adjacent the inner surface of the member $A^5$. $D^2$ diagrammatically indicates any suitable control means interposed in the actuating circuit of the resistance elements and adapted to make and break the actuating circuit in response to change in temperature of the member $A^5$.

In order to operate upon the tire I provide a lower matrix member E which rests upon the flange $A^3$ and which conforms also to the inner face of the member $A^5$. A corresponding upper matrix $E^1$ completes the matrix impression for the tire. In practice the casing may be laid upon the matrix E. The matrix $E^1$ is then superposed and may be clamped down by any suitable means. I instance for example the clamps E² which may be tightened as by the bolts E³, to draw them downwardly against the bosses or base A⁷. These clamps hold the upper matrix member E¹ in position upon the lower matrix E and clamp the assembly in place, with the tire in position for treatment. The tire may be treated with a rim E⁴ in place.

It will be realized that whereas I have described and shown a practical and operative device, nevertheless many changes might be made in the size, shape, number and disposition of parts without departing from the spirit of my invention. I therefore wish my description and drawing to be taken as in a broad sense illustrative and diagrammatic rather than as limiting me to my specific showing.

As to the actual heat responsive means employed I may for example employ a Bourdon tube and the drawing contains a diagrammatic showing of such a tube.

The use and operation of my invention are as follows:

In retreading tires the rubber to be treated is positioned chiefly on the bottom of the tire and extends up about the sides of the tire only a limited distance, it being the tread portion proper which is primarily affected. In the retreader herein described and claimed I have provided a particularly efficient and economical and safe device for applying heat to the tread. The member A⁵, in the form of a ring or short cylinder, extends entirely about the tread of the tire. The matrix or matrices which actually engage the tire are formed to maintain a close engagement with the inner face of the member A⁵. These matrix members E and E¹ may be made for example of aluminum, and readily transmit the heat from the member A⁵ to the tread of the tire. To the outer face of the member A⁵ I secure the resistance elements in close contact. I have illustrated two separate resistance elements, separated along the central portion of the member A⁵. This separation is for the purpose of coping with the tendency of the rather heavy casting to build up heat in the center if heat is applied evenly throughout its entire outer surface. If a very thin sheet of metal were used, the heat might pass directly therethrough, but inasmuch as it is necessary to employ a relatively thick casting or band, the intermediate area tends to get hotter than the edges, if the heat is evenly applied to the exterior, causing an uneven application of the heat to the work. By splitting the resistance element and by providing the break B⁸ between the elements, in line with the central portion of the casting where the heat building up tendency exists, I get a very even distribution of effective heat at the inner face of the casting. Or rather, I get such distribution as is necessary to cause the matrix members E E¹ to deliver an even heat to the rubber of the tread. The insulation to the exterior of the resistance elements, coupled with the close contact which is maintained between the resistance elements and the exterior of the member A⁵, serves to drive the heat from the resistance element into the casting. In maintaining the desired intimate contact of the resistance elements with the casting I find the circumferential band B⁴ particularly efficient, since its ends can be drawn together to clamp the arcuate or circular resistance elements very firmly against the exterior of the member A⁵. This intimate contact is an important feature in connection with heating efficiency and heating uniformity and also in connection with the life of the resistance element. If an intimate contact is not maintained with some heat conductive member, such as the member A⁵, the heat of the resistance element will not be carried off, but will be built up in the resistance element itself. This will reduce the life of the resistance element by breaking down its insulation and by oxidizing the resistance wire itself. This is avoided by maintaining the intimate contact with the member A⁵ above referred to.

While I do not wish to be limited to any particular resistance heating element, I find it useful and practical to employ a heating element in which generally flat resistance wires are compressed between plates of thin insulating material, such as mica.

I claim:

1. In a vulcanizing device, an annular frame member having a generally cylindrical outer face, a work engaging matrix opposed to and in close engagement with the inner face of said frame member, and electrical resistance heating means opposed to and conforming to the exterior cylindrical face of said frame member, said heating means comprising the employment of a pair of annular resistance elements extending circumferentially about the exterior cylindrical face of the frame member and spaced laterally apart thereupon along the axis of said cylinder to prevent excess of heat at the central portion of the matrix.

2. A tire vulcanizer including a cylindrical member for embracing a tire, and means for heating said member including a flexible heating element arranged about the periphery of said cylindrical member and a tensioning band about said element for drawing the element into intimate contact with the outer periphery of said cylindrical member.

3. A tire retreader comprising an annular cylindrical member having an inwardly extending flange at the base thereof to receive tread mold members within said cylindrical member with the tread mold members supported on said flange, clamps mounted on the top of said cylinder for clamping said tread mold members on said flange, said cylindrical member being provided with outer peripheral flanges at the base and top thereof, an electrical heating element about said cylindrical member between said outer peripheral flanges, insulating material about said heating element between said outer peripheral flanges, a casing about said insulating material, said casing being secured to the last-named flanges, and means between the casing and the flanges for insulating the former from the latter.

Signed at Chicago, county of Cook and State of Illinois, this 25th day of October, 1929.

LEO O. GRANGE.